United States Patent
Zhao et al.

(10) Patent No.: US 9,781,297 B2
(45) Date of Patent: Oct. 3, 2017

(54) SYSTEM AND METHOD FOR DOCUMENT RENDERING

(71) Applicants: Kabushiki Kaisha Toshiba, Minato-ku (JP); Toshiba TEC Kabushiki Kaisha, Shinagawa-ku (JP)

(72) Inventors: Dehua Zhao, Irvine, CA (US); Jia Chen, Monterey Park, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/010,575

(22) Filed: Jan. 29, 2016

(65) Prior Publication Data

US 2017/0223220 A1    Aug. 3, 2017

(51) Int. Cl.
| G06F 15/00 | (2006.01) |
| H04N 1/32 | (2006.01) |
| H04N 1/00 | (2006.01) |
| H04N 1/36 | (2006.01) |

(52) U.S. Cl.
CPC ..... H04N 1/32641 (2013.01); H04N 1/00106 (2013.01); H04N 1/00251 (2013.01); H04N 1/36 (2013.01); H04N 2201/006 (2013.01); H04N 2201/0017 (2013.01); H04N 2201/0041 (2013.01); H04N 2201/0055 (2013.01); H04N 2201/0094 (2013.01)

(58) Field of Classification Search
None
See application file for complete search history.

(56) References Cited

U.S. PATENT DOCUMENTS

| 2007/0013956 | A1* | 1/2007 | Mikami | H04N 1/00278 358/296 |
| 2014/0104653 | A1* | 4/2014 | Moyer | G06F 3/1222 358/1.15 |
| 2015/0092233 | A1* | 4/2015 | Park | G06F 3/1288 358/1.15 |
| 2015/0133052 | A1* | 5/2015 | Reunamaki | H04W 76/027 455/41.2 |

* cited by examiner

*Primary Examiner* — Helen Q Zong
(74) *Attorney, Agent, or Firm* — Ulmer & Berne LLP

(57) ABSTRACT

A system and method for capturing and rendering of images includes a wearable or portable data device including a digital camera. A data storage includes data specifying a default image printer and default print settings for digital images. An image capture operation triggers a prompt for expedited image rendering in accordance with preset default settings. Input responsive to the prompt selects for immediate commencement of a print operation for a captured image in accordance with default settings. Image capture and communication can be accomplished with wearable digital eyewear working in concert with an associated, portable data device such as a smartphone. Captured images may be queued in a user device when a data path to the printer is unavailable.

20 Claims, 5 Drawing Sheets

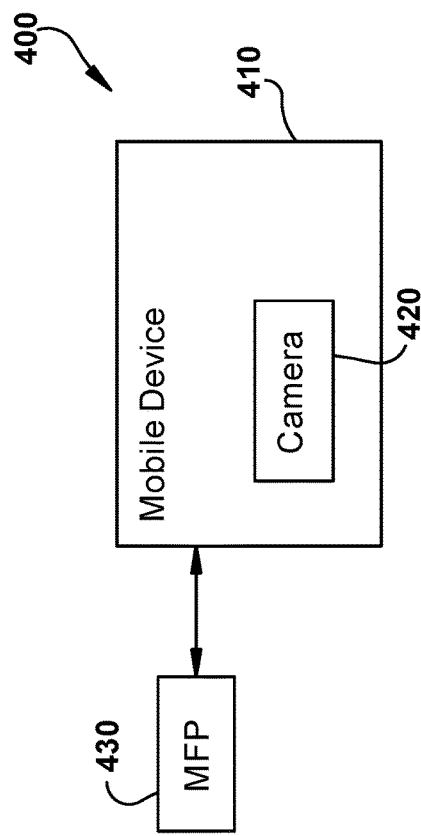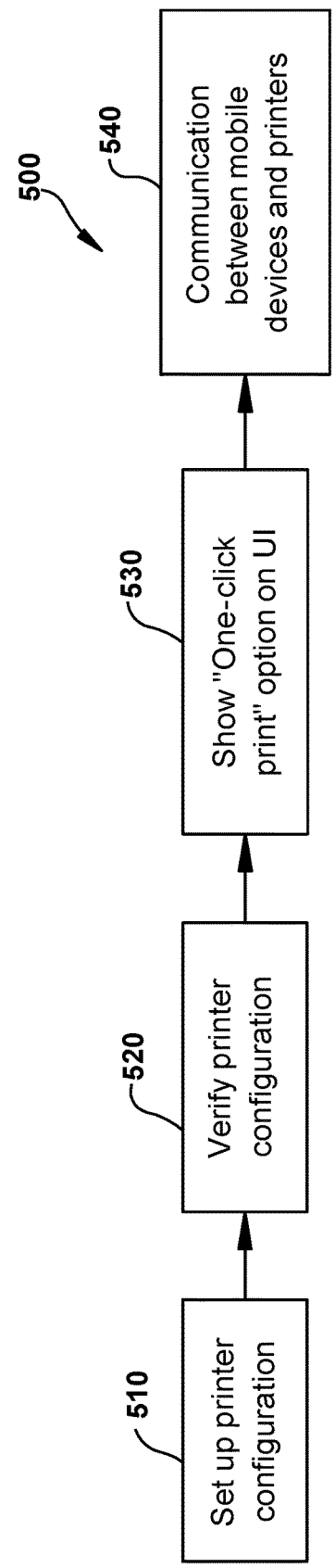

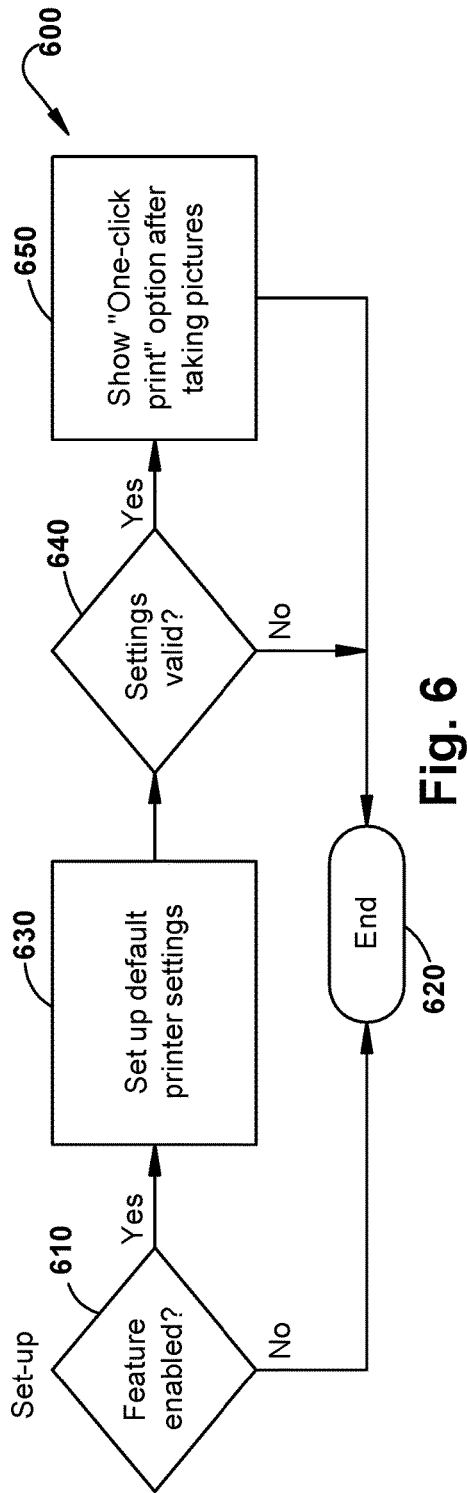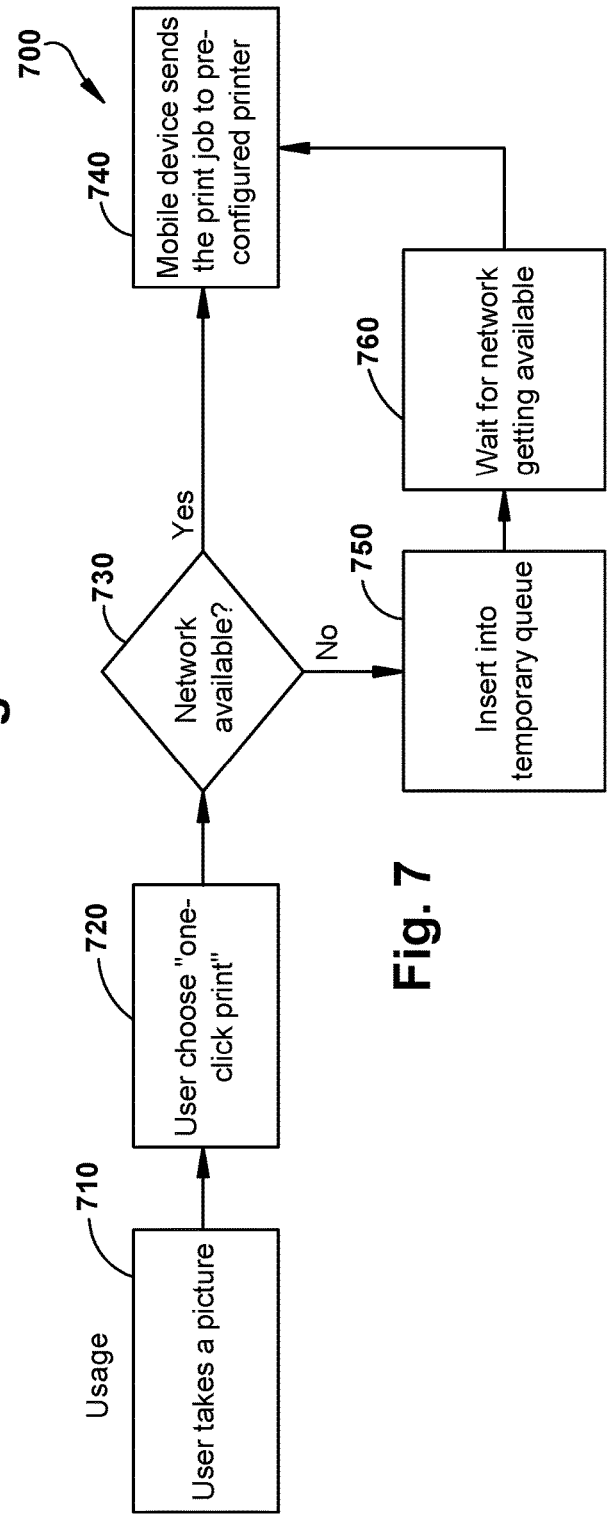

SYSTEM AND METHOD FOR DOCUMENT RENDERING

TECHNICAL FIELD

This application relates generally to rendering of rendering of images. The application relates more specifically to rendering of images captured by portable or wearable devices.

BACKGROUND

Portable data devices, including wearable devices, are becoming increasingly common. Increased usage follows from advancements affording more features, easier use and lower cost. Devices include smartphones, tablet computers, smart watches and digital eyewear such as Google Glass or Toshiba Glass.

Portable data devices typically include processors and associated memory, and other systems that facilitate motion or still image capture, wireless or wired data transmission, tactile input, haptic feedback, audio input or position tracking. Multiple devices may be enabled to communicate with one another by a wired tether or wireless interface.

Users of portable data devices continuously find new ways to integrate the devices into their lifestyle. People may take a photo and immediately share it with friends or colleagues, either directly or via social media. Some also use their devices to memorialize events, images or documents for use by themselves. For example, users may take a photograph of a canned item to remind them to purchase more, or a copy of a wine bottle from a restaurant for a wine that they particularly enjoyed.

SUMMARY

In accordance with an example embodiment of the subject application, a system and method for expedited image capture and rendering includes a processor and associated memory. An input receives receive printer selection data corresponding to a default printer. The memory stores received printer selection data and an input receives sync data corresponding to at least one portable imaging device. Data relative to device pairing is generated by the processor and stored in the memory, along with data identifying the default printer. An input receives image data corresponding to at least one captured image which is stored in the memory. The processor generates prompt data corresponding to a selectable rendering of the image data on the default printer. Prompt data is generated and an output communicates the image data to the default printer in accordance with received response data relative to the prompt.

BRIEF DESCRIPTION OF THE DRAWINGS

Various embodiments will become better understood with regard to the following description, appended claims and accompanying drawings wherein:

FIG. 4 is a block diagram of an example embodiment of an image rendering system;

FIG. 5 is a flow diagram of example software modules;

FIG. 6 is a flowchart of an example embodiment of a system setup; and

FIG. 7 is a flowchart of an example embodiment of a system operation.

DETAILED DESCRIPTION

Figure 1:
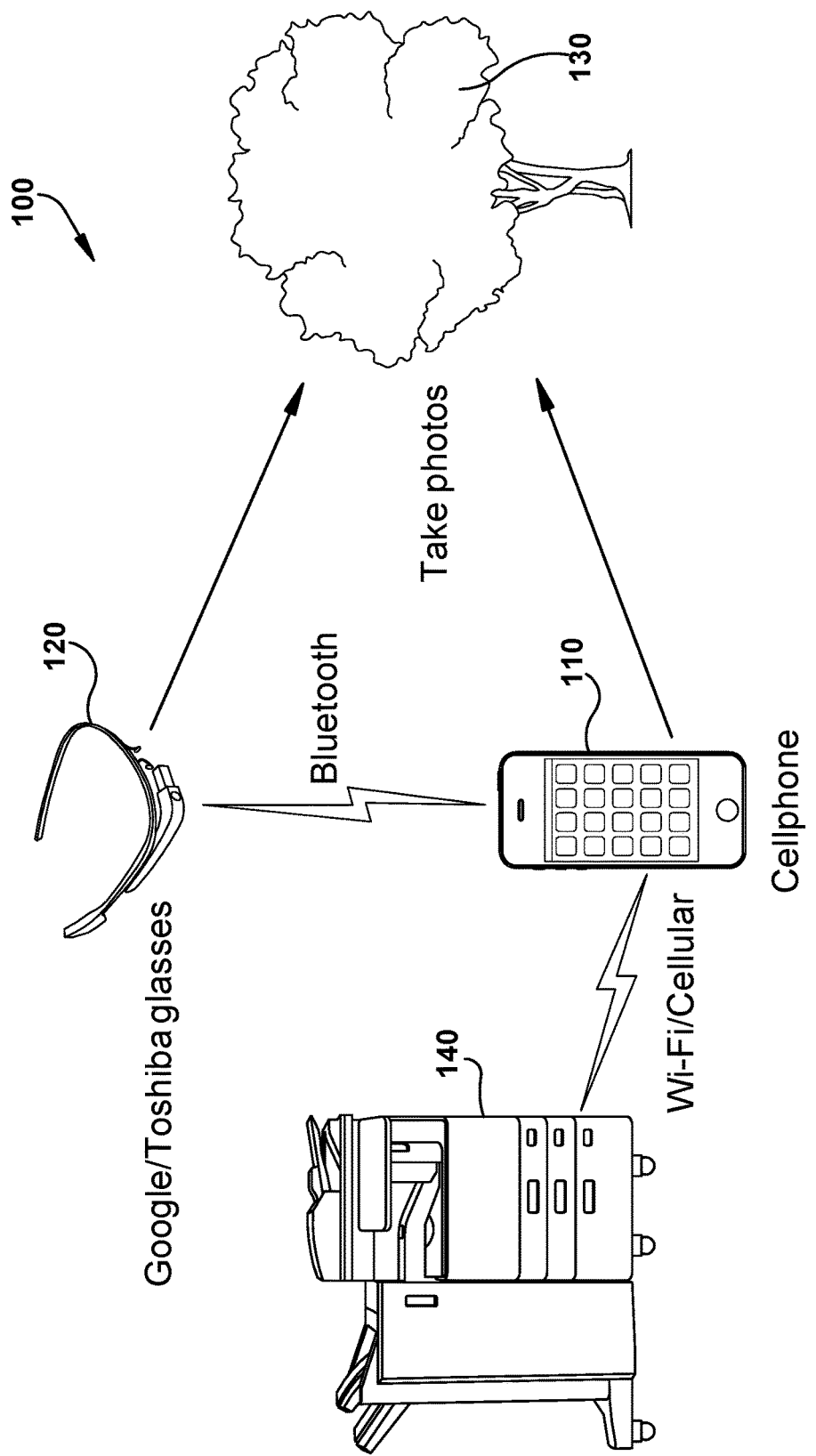
FIG. 1 is an example embodiment of an image capture and rendering system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When users of electronic devices, such as the portable data devices noted above, capture pictures, which pictures may include stills from a captured video stream, the pictures exist in electronic form and are typically stored in a non-volatile memory. Common storage areas include cloud storage or local storage, such as flash memory, hard disk, optical disk, and the like. Common digital image formats include raster formats such as JPEG, TIFF, GIF, RAW, BMP, and the like, as well as vector formats, such as CGM or Gerber.

While images are frequently kept in electronic form, doing so requires a user to have access to an electronic device to view them. There are times when a hard copy, such as a rendered photograph, is desired. Hard copies can be viewed immediately and without any device, and they can be shared easily. Printouts of images can be substantially larger than would be possible with a relatively small video display, particularly with the type found on smartphones or tablet computers. Printouts can also be easily marked or annotated with ubiquitous tools such as pens, pencils or markers.

Securing a printed copy of an image, particularly one captured with a portable data device, can be problematic or time consuming. Most portable devices do not include print capabilities, so the image data must be communicated to an appropriate rendering device. This may be done by plugging a cable into the device to connect directly to the printer via an interface such as USB or Firewire. This may also be done wirelessly, such as via Bluetooth, near-field communication or optically. Communication of image data can also be accomplished via a network interface, wired or wireless, that connects the portable device with one or more networked devices.

In accordance with the subject application, image rendering devices include document processing devices such as printers.Printing capability may exist in devices that include other functions such as copying, scanning and e-mail and emailing. These devices are referred to as multifunction peripherals (MFPs) or multifunction devices (MFDs). MFPs are used in connection with example embodiments disclosed in detail below, but it is to be appreciated that any suitable document processing device can be used.

Given the expense in obtaining and maintain MFPs, devices are frequently shared among users via a data network. Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and waits for the printed document to be output. If multiple users send their requests to the same device, the jobs are queued and outputted sequentially.

By way of example, a student in a lecture may want take a picture of a visual presentation, such as notes or diagrams created by a teacher or professor. These may appear on a screen or board at the front of the classroom. A student may also want to take a picture of notes from another student. The image may be somewhat easily captured by using the camera function on a smartphone, but securing the actual printout can be difficult and time consuming. The student would first need to identify one or more compatible printers. Then, the student would have to take their portable device to the printer and transfer the digital image data such as via a means noted above. The student can then select printout options, such as color or black-and-white, paper size, resolution, orientation, and the like. Once required options have been selected and the image transferred to the device, the printing can commence.

In accordance with example embodiments taught herein, capturing and rendering of an image can be accomplished quickly and easily. For example, a user can pre-configure a default printer and default printer settings on a mobile device, such as a tablet or smartphone that is synced to a wearable image capture device such as Google Glass or Toshiba Glass. The user need only look at something they wish to photograph, and initiate image capture and rendering. The user may commence the operation by tapping on the glasses frame, which suitably initiates a confirmation prompt for capturing and printing. Once confirmed, the image is sent to the default printing device with the default print settings. In the example noted above, the student may choose to memorialize a slide image projected at the front of the classroom. The user has preconfigured his own printer which is a networked printer in his dorm room. The user looks at the slide, taps his Google Glasses, and response affirmatively to a prompt to confirm printing. The printout of the slide will be awaiting him when he returns to his dorm room.

Details of a system and method suitable to accomplish the forgoing will be understood in descriptions of example embodiments, which example embodiments are detailed in the accompanying drawings. Referring first to FIG. 1, illustrated is an example embodiment of an image capture and rendering system 100. A user is suitably associated with portable or wearable data devices such as a cellphone or smartphone, along with image capturing hardware. In the illustrated example, the cellphone 110 is associated by digital glasses 120, suitably comprised of Google Glass or Toshiba Glass, or any other portable data device including image capture functionality. In the illustrated example, cellphone 110 and digital glasses 120 are synced or paired to be in data communication via a short range data communication interface, such as a BLUETOOTH interface, NFC interface or the like. A user suitably initiates an image capture, such as directing capture an image of any object, objects or scene, such as object 130, illustrated as a tree. The user's wearable device or devices are suitably preconfigured with a default image rendering device, such as via MFP 140, suitably including default rendering parameters. An image capture operation allows for an image to be captured and communicated with the printer of MFP 140 for rendering. In the illustrated example embodiment of FIG. 1, image data is communicated from cellphone 110 to MFP 140 via a network link, at least a portion of which is wireless, such as Wi-Fi or cellular.

Figure 2:
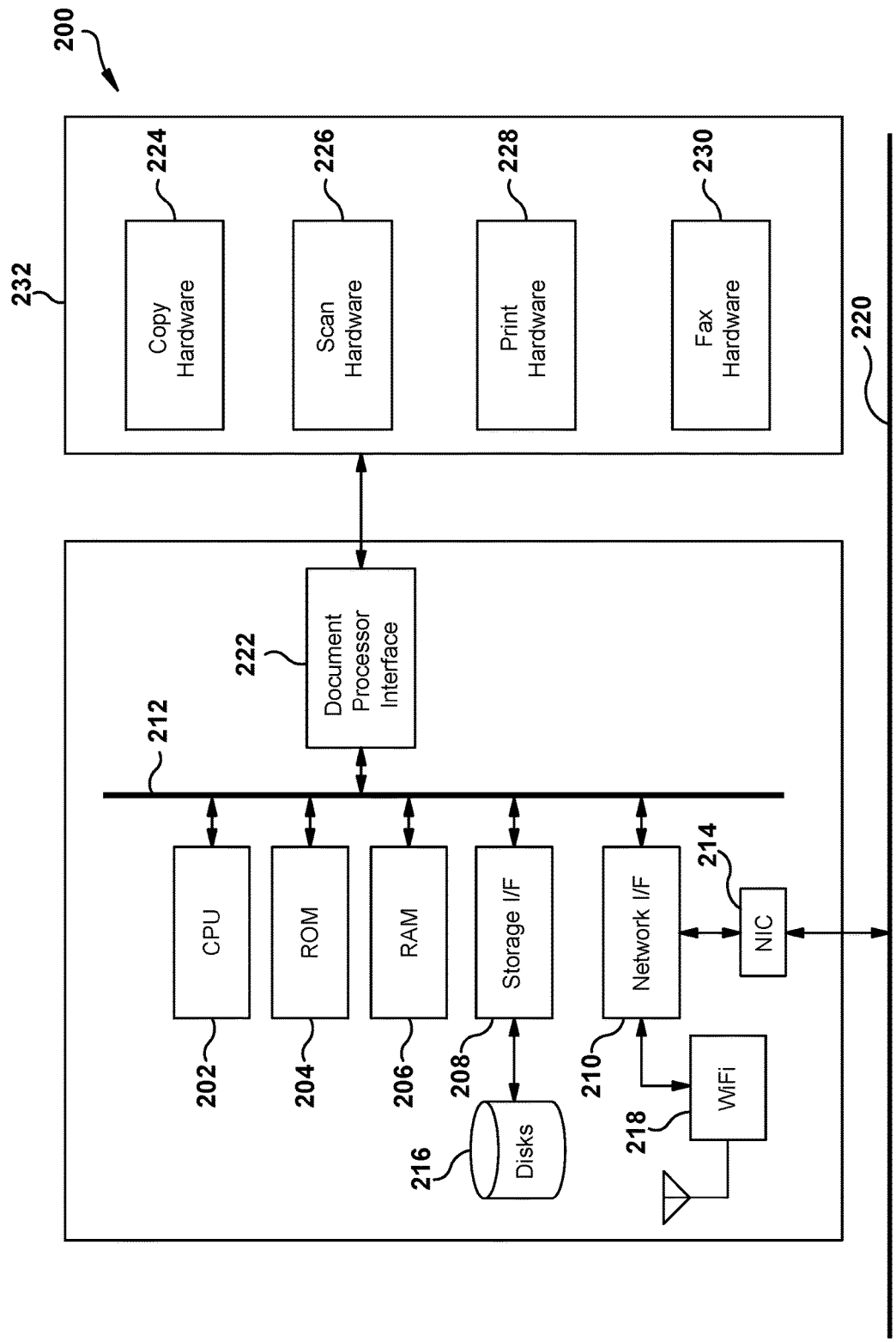
FIG. 2 is an example embodiment of a document rendering system.

Turning now to FIG. 2, illustrated is an example of a document rendering system 200 suitably comprised within an MFP, such as MFP 140. Included are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like. NIC 214 and wireless network interface 218 suitably provide for connection to an associated network 220.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface suitable for data communication with MFP functional units. In the illustrate example, these units include copy hardware 224, scan hardware 226, print hardware 228 and fax hardware 230 which together comprise MFP functional hardware 232. It will be understood that functional units are suitably comprised of intelligent units, including any suitable hardware or software platform.

Figure 3:
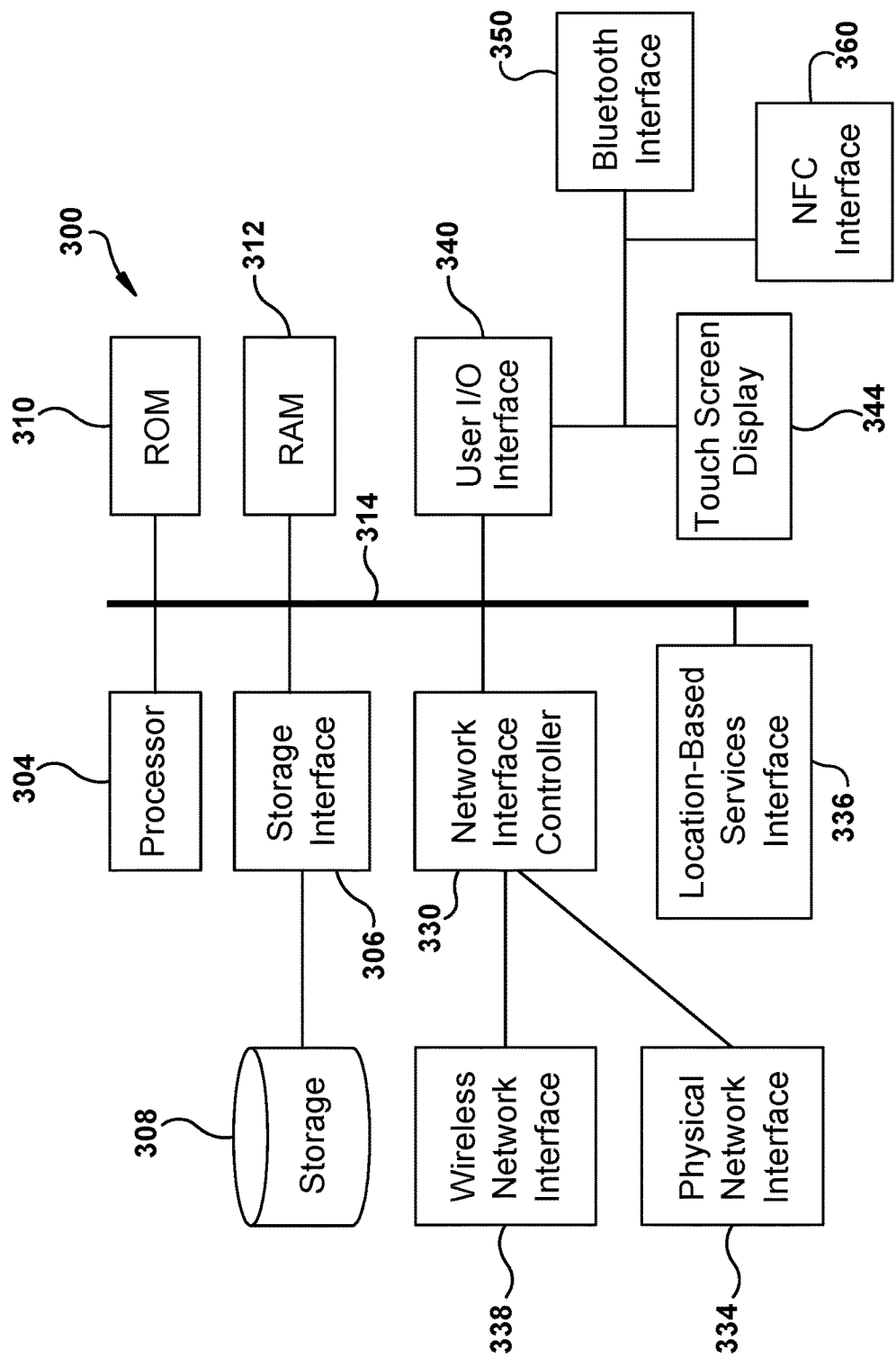
FIG. 3 is an example embodiment of a digital device comprising a portable or wearable data devices.

Turning now to FIG. 3, illustrated is an example of a digital device system 300 suitably comprising portable or wearable data devices. Included are one or more processors, such as that illustrated by processor 304. Each processor is suitably associated with non-volatile memory, such as ROM 310, and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like.

Processor 304 is also in data communication with a user input/output (I/O) interface 340 which provides data communication with user peripherals, such as display 344, as well as keyboards, mice, track balls, touch screens, or the like. It will be understood that functional units are suitably comprised of intelligent units, including any suitable hardware or software platform.

Referring now to FIG. 4, illustrated is a block diagram of an example embodiment of an image rendering system 400. Included is a mobile device 410, suitably comprised of a smartphone, tablet computer, wearable device, or any other suitable digital data device that can be readily transported and associated with a user. Mobile device 410 includes a digital imaging system, illustrated as camera 420. Camera 420 is comprised of any suitably image capture system, such as a charge-coupled device (CCD) camera. Mobile device 410 is in data communication with a suitable image rendering device, such as MFP 430

Turning now to FIG. 5, illustrated is a flow diagram 500 of an image rendering system such as illustrated above. In the example, printer configuration, suitably specifying a default rendering device and a default configuration, is set by a user at block 510. This configuration is suitably verified at block 520. A user may optionally be afforded an opportunity to correct or adjust prior settings in accordance with such verification. Next, the user is prompted at block 430 to show a simplified image rendering selection, such as a prompt for a "one click" print operation. This option is suitably provided on a wearable device, such as Google Glass or Toshiba Glass as detailed above, as well as on any suitably display on a user's portable or wearable data device. A user need only direct a camera to a desired object or scene, commence an image capture and confirm a rendering. After this, the image is communicated from the user's device to a rendering device at block 540 for immediate rendering, or for deferred or delayed rendering in accordance with a preset or specified timing.

Referring particularly to FIG. 6, illustrated is a flowchart 600 of an example system setup. A setup suitably commences at block 610 wherein a determination is made as to whether a rendering feature such as that detailed above is available. If not, the system suitably terminates at block 620. If so, progress is made to block 630 where a default printer and associated settings are obtained. Validity of these selections is suitably made at block 640. If the settings are invalid, the process suitably terminates at block 620. Alternatively, the process can also proceed back to block 630 and afford a user an opportunity to reconfigure settings or select another printer. Valid settings may also include a determination whether a selected device is available or unavailable, such as being off-line or broken. Once valid settings are achieved, progress is suitably made to block 650 wherein a prompt for image rendering is made available to the user during device operation or for a selected duration. Once the prompt is generated, setup suitably terminates at block 620

Turning now to FIG. 7, illustrated is a flowchart 700 for an example system operation. The system operation suitably commences at block 710 when a user captures an image, such as by taking a picture with their portable device. A prompt having been generated for image rendering, such as detailed above, allows the user to select the same at block 720. A determination is made at block 730 if a network or other suitable data path to the default image rendering device or devices is available. If so, the resultant digital image is communicated to that device for rendering at block 740. If not, the image is suitably placed in a temporary queue at block 750. When the network or other data path becomes available at block 760, the image is communicated at block 740.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a printer;
   at least one data interface operable to receive printer selection data corresponding to the printer as a default printer;
   at least one portable imaging device;
   the at least one data interface operable to receive sync data corresponding to the at least one portable imaging device;
   an input operable to receive image data corresponding to at least one image captured by the at least one portable imaging device;
   a processor and associated memory,
      the memory operable to store received printer selection data,
      the processor operable to generate pairing data in accordance with received sync data,
      the memory operable to store the pairing data identifying the at least one portable imaging device,
      the processor operable to pair the portable imaging device for exchange of image data in accordance with the pairing data;
      the memory operable to store received image data, and
      the processor operable to generate prompt data corresponding to a rendering of the image data on the default printer;
   the at least one data interface operable to communicate the prompt data to the at least one portable imaging device;
   the at least one data interface operable to receive response data corresponding to the prompt data; and
   the at least one data interface operable to communicate the image data to the default printer in accordance with received response data; and
   the default printer configured to receive the image data.

2. The system of claim 1 further comprising:
   the at least one data interface operable to receive configuration data corresponding to a configuration of the at least one portable imaging device; and
   the at least one data interface operable to generate an error signal to the at least one portable imaging device in accordance with verification of received configuration data,
   wherein the processor is operable to verify received configuration data.

3. The system of claim 2 wherein the input operable to receive image data is comprised of a wireless link.

4. The system of claim 3 further comprising:
   the at least one data interface operable to receive confirmation data from the at least one portable imaging device corresponding to a successful rendering of an image defined by the image data; and
   the at least one data interface operable to communicate notification data to the at least one portable imaging device in accordance with received confirmation data.

5. The system of claim 4 wherein:
the processor is operable to test integrity of a data path with the default printer; and
the processor is operable to communicate the image data to the default printer in accordance with tested integrity of the data path.

6. The system of claim 5 wherein the input operable to receive sync data is comprised of a Bluetooth interface.

7. The system of claim 5 wherein the output operable to communicate the image data is comprised of a cellular interface.

8. A method comprising:
receiving, into a user device including a processor and associated memory, printer selection data identifying a default printer;
storing received printer selection data in the memory;
receiving sync data corresponding to at least one portable imaging device;
generating, via the processor, pairing data in accordance with received sync data;
storing the pairing data identifying the at least one portable imaging device in the memory;
paring with the at least one portable imaging in accordance with the pairing data;
capturing image data into the at least on portable imaging device;
receiving captured image data corresponding to at least one paired image captured by the at least one portable imaging device;
storing received image data in the memory;
generating, via the processor, prompt data corresponding to a rendering of the image data on the default printer;
communicating the prompt data to the at least one portable imaging device; and
receiving response data corresponding to the prompt data;
communicating the image data to the default printer in accordance with received response data; and
receiving communicated imaged data into the default printer.

9. The method of claim 8 further comprising:
receiving configuration data corresponding to a configuration of the at least one portable imaging device;
verifying received configuration data; and
generating an error signal to the at least one portable imaging device in accordance with verification of received configuration data.

10. The method of claim 9 further comprising receiving image data via wireless link.

11. The method of claim 10 further comprising:
receiving confirmation data from the at least one portable imaging device corresponding to a successful rendering of an image defined by the image data; and
communicating notification data to the at least one portable imaging device in accordance with received confirmation data.

12. The method of claim 11 further comprising:
testing integrity of a data path with the default printer; and
communicating the image data to the default printer in accordance with tested integrity of the data path.

13. The method of claim 12 further comprising receiving sync data via a Bluetooth interface.

14. The method of claim 12 further comprising communicating the image data via a cellular interface.

15. A system comprising:
a wearable device including a digital camera;
a multifunction peripheral;
a rechargeable battery;
a processing system, powered by the battery, including a processor and associated memory;
a user interface;
at least one short range wireless data communication interface; and
a wireless network data communication interface,
wherein the at least one short range data interface is configured to establish a data channel with the wearable device,
wherein the network data interface is configured to establish a data channel to at least one multifunction peripheral,
wherein the user interface is configured to receive printer selection data stored in the memory, the printer selection data identifying a the multifunction peripheral as a default multifunction peripheral,
wherein the at least one short range data interface is configured to receive digital image data from the digital camera,
wherein the processor is configured to generate a prompt data in response to response to received image data,
wherein the at least one short range data interface is configured to communicate the prompt data to the wearable device,
wherein the at least one short range data interface is configured to receive response data corresponding to the prompt data,
wherein the network interface is configured to communicate the image data to the default multifunction peripheral with data corresponding to a request to render the image data; and
wherein the multifunction peripheral is configured to receive communicated image data.

16. The system of claim 15 wherein
the processor is further configured to test operability of the data channel, and
the processor is further configured to selectively store the image data in the memory in accordance with operability of the data channel.

17. The system of claim 15 wherein the wearable device is comprised of digital eyewear.

18. The system of claim 15 wherein the wireless network data communication interface is comprised of a cellular network interface.

19. The system of claim 15 wherein the wireless network data communication interface is comprised of a Wi-Fi interface.

20. The system of claim 15 wherein the at least one short range data interface is comprised of a Bluetooth interface.

* * * * *